United States Patent Office 2,974,127
Patented Mar. 7, 1961

2,974,127

RESINS FROM UNSATURATED ACETALS

Donald E. Hudgin, Summit, N.J., assignor to Celanese Corporation of America, New York, N.Y., a corporation of Delaware No Drawing. Filed Apr. 9, 1957, Ser. No. 651,571

10 Claims. (Cl. 260—88.3)

This application relates to resins produced from unsaturated polyacetals and more particularly to resins produced with water as a reactant therewith.

It is known that hard, tough resinous polymers may be produced by reacting an unsaturated polyacetal, such as diallylidene pentaerythritol with certain polyhydroxy alcohols. The suitable polyhydroxy alcohols have been found to be those with at least two but not more than six hydroxy groups having at least two hydroxy groups separated from one another by a carbon bridge of at least three carbon atoms. Among the specific polyhydroxy alcohols disclosed are the hexa-hydroxy sugar alcohols such as mannitol, sorbitol and dulcitol; and trimethylol propane, trimethylol ethane, 2,3,5,6-tetramethylol-1,4-hydroquinone dimethyl ether and 2,4-hydroxy-3 hydroxymethyl pentane.

In accordance with this invention, it has been found that water, despite the fact that it is inorganic and has only a single hydroxy group, reacts with unsaturated polyacetals to produce similar hard, tough, resinous polymers.

In the preferred embodiment of this invention, the unsaturated diacetal is combined with water and a suitable catalyst at a temperature above the fusion temperature of the diacetal, precured for a short time at an elevated temperature and then cured at a lower temperature until constant surface hardness is obtained. It has been found that the reaction product of this invention may be cured at lower temperatures and for shorter periods than the reaction product of the unsaturated diacetals with polyhydroxy alcohols, while producing products of comparable quality.

The diacetals which may be used in accordance with this invention are those prepared from pentaerythritol and from anhydroenneaheptitol and an α, β, ethylenically unsaturated aliphatic aldehyde preferably a straight chain α, β, ethylenically unsaturated aldehyde having not more than four carbon atoms. Pentaerythritol forms diacetals with acrolein and crotonaldehyde, for example, in the presence of a small amount of acid, such as phosphoric acid, as catalyst. The diacetals formed are diallylidene pentaerythritol, and dicrotonallylidene pentaerythritol, respectively. Anhydroenneaheptitol forms similar diacetals. A complete description of a preferred method of preparing the unsaturated diacetals of pentaerythritol used in this invention may be found in United States application Serial Number 550,757, filed by Raymond J. Kray and Frank Brown on December 2, 1955. A description of a preferred method of preparing the unsaturated diacetals of anhydroenneaheptitol may be found in United States application Serial Number 651,572, filed by Donald E. Hudgin on April 9, 1957.

The water reactant is added in amounts between about 0.2 and about 1.5 equivalents of water per equivalent of unsaturated diacetal based upon moles of water per double bond. The preferred proportion of water is between about 0.4 and about 0.6 equivalent per equivalent of diacetal.

Any of the catalysts of acidic nature known to be effective for the production of resins from unsaturated diacetals and polyhydroxy alcohols may be used as a catalyst in accordance with this invention. Among the classes of catalysts which may be used are the boron fluoride complexes, such as boron fluoride hydrate, boron fluoride etherate and boron fluoride acetic acid complexes; organic sulfonic acids, such as p-toluene sulfonic acid, d-camphor sulfonic acid, 2-chlorcymol sulfonic acid, ethane sulfonic acid and m-benzene sulfonic acid; and tin chloride complexes such as tin chloride-hydrochloric acid hexahydrate. The amount of catalyst added depends on the activity of the catalyst and upon the rapidity of curing desired. With a boron fluoride complex as little as a few thousandths of one percent by weight may be used. With other catalysts the amount may be as high as 1 or 2 percent by weight. Generally, it is preferred to use amounts between about 0.2 and about 1.0 percent by weight.

The admixture of unsaturated diacetal, the water and the catalyst is preferably precured for a period between about 45 and 90 minutes at a temperature between the fusion temperature and about 80° C. while stirring to make a uniform mixture. It is then permitted to cool while curing is continued until a constant surface hardness is obtained. The catalyst initially present in the admixture continues to be effective throughout the curing period, although, if desired, additional catalyst may be added after the precuring step. The temperature and period of curing are interdependent, with shorter periods being associated with higher temperatures. They are also dependent on the amount and activity of the catalyst in the admixture. In general, however, much milder conditions and shorter curing periods may be used in the preparation of the resins of this invention as compared with resins using polyhydroxy alcohols. Table I shows a comparison in curing conditions between the resins of this invention and similar resins utilizing sorbitol as the polyhydroxy alcohol. The curing conditions in each case are those sufficient ot obtain a complete cure, as indicated by constant surface hardness.

TABLE I

| Resin | Curing Time, hrs. | Curing Temperature, ° C. |
|---|---|---|
| Diallylidene pentaerythritol-sorbitol | 16–20 | 80–90 |
| Diallylidene pentaerythritol-water | 4–5 | 50 |

(Alternatively, the resin produced with water may be cured for 3 days at 25° C.)

The completion of curing at 50° C. may be demonstrated by the following data showing surface hardness measurements at various curing times for the diallylidene pentaerythritol-water resin.

TABLE II

Curing time (50° C.):                  Sward rocker hardness
    Start _____ 9
    1½ hrs. _____ 19
    4½ hrs. _____ 41
    7 hrs. _____ 41
    64 hrs. _____ 41

Thus it may be seen that at 50° C. substantially complete curing is obtained in about 4½ hours.

*Example I*

Diallylidene pentaerythritol (21.2 parts by weight) was melted in an open flask by heating in an oil bath at 50° C.

A solution of 0.2 part by weight of ethane sulfonic acid in 1.8 parts by weight of water was added to the diallylidene pentaerythritol with good stirring. The temperature was raised to 80° C. over a 15 to 20 minute period and then held at 80° C. for 45 minutes. The homogenous mixture became quite thick over this period and was then poured on to glass, aluminum and tin plates. In 24 hours at room temperature the coatings could be handled freely, and in 72 hours the cure was essentially complete, as indicated by no further increase in surface hardness.

The resin of Example I was compared in physical properties with a similar resin prepared from diallylidene pentaerythritol and sorbitol. The results are shown in Table III.

TABLE III

| Physical Test | Diallylidene Pentaerythritol-Sorbitol | Diallylidene Pentaerythritol-Water |
|---|---|---|
| Flexural Strength, p.s.i. | 20,300 | 19,900 |
| Rockwell hardness | M-108 | M-102 |
| Heat Distortion, °C | 97 | 80 |

Thus, it may be seen that the substitution of water for the sorbitol of the prior art produces a resin of substantially similar quality.

*Example II*

Dicrotonylidene pentaerythritol (24 parts by weight) was melted at 50° C. in an open flask. Water (1.8 parts by weight) and 0.48 part by weight of ethane sulfonic acid dissolved in 1.8 parts by weight of ethyl acetate was added. The temperature was raised slowly to 80° C. and held at that temperature for about 45 minutes during which time the homogenous liquid thickened considerably. It was poured out and cured at room temperature for 3 days. A hard brown resin resulted.

It is to be understood that other modifications of the process and products of this invention may be used without departing from the scope thereof. For example, fillers and/or pigments may be added to the admixture, if desired, to effect changes in the properties or color of the resins produced.

Also, if desired, the reaction of unsaturated diacetals with water may be combined with the known reaction of unsaturated diacetals with polyhydroxy alcohols to produce a combined resinous product. For example, diallylidene pentaerythritol may be combined with a less than equivalent amount of water and, generally, with a less than equivalent amount of sorbitol to produce a combined resinous product. It is important, in such a case, to use a less than equivalent amount of water, since the curing of the water-reaction product is so much faster than the curing of the sorbitol-reaction product that the latter might be prevented from being formed if equivalent or greater amounts of water were present. If a combined resinous product is desired, the amount of water should preferably be restricted to between about 0.2 and about 0.8 equivalent of water per equivalent of unsaturated diacetal, while the amount of sorbitol or other polyhydroxy alcohol, may be between about 0.2 and about 2.0 equivalents, in each case based upon hydroxy groups per double bond. It is to be noted that the sorbitol may be used in excess if desired, since its presence will not adversely affect the more rapidly curing water.

It is to be understood that the foregoing detailed description is merely given by way of illustration and that many variations may be made therein without departing from the spirit of my invention.

Having described my invention, what I desire to secure by Letters Patent is:

1. A method for the production of a resin which comprises contacting a molten unsaturated diacetal of a polyhydric alcohol selected from the group consisting of pentaerythritol and anhydroenneaheptitol and an aldehyde selected from the group consisting of acrolein and crotonaldehyde with from about 0.2 to 1.5 equivalents of water per equivalent of said unsaturated diacetal based upon moles of water per double bond, maintaining the thus formed mixture in the presence of an acidic catalyst above the fusion temperature of said diacetal, and then allowing said admixture to cure.

2. The method of claim 1 wherein said acidic catalyst is a boron fluoride complex.

3. The method of claim 1 wherein said admixture of water and said diacetal is maintained between the fusion temperature of said diacetal and about 80° C. for a period between 45 and 90 minutes and is then cooled.

4. A method for the production of a resin which comprises contacting molten diallylidene pentaerythritol with from about 0.2 to about 1.5 equivalents of water per equivalent of diallylidene pentaerythritol based upon moles of water per double bond, maintaining the thus formed mixture in the presence of an acidic catalyst above the fusion temperature of diallylidene pentaerythritol, and then allowing said admixture to cure.

5. A method for the production of a resin which comprises contacting molten dicrotonylidene pentaerythritol with from about 0.2 to about 1.5 equivalents of water per equivalent of dicrotonylidene pentaerythritol based upon moles of water per double bond, maintaining the thus formed mixture in the presence of an acidic catalyst above the fusion temperature of dicrotonylidene pentaerythritol, and then allowing said admixture to cure.

6. A method for the production of a resin which comprises contacting molten diallylidene pentaerythritol with from about 0.4 to about 0.6 equivalent of water per equivalent of said diallylidene pentaerythritol based upon moles of water per double bond, maintaining the thus formed mixture in the presence of an acidic catalyst at a temperature between the fusion temperature and about 80°C. for a period between about 45 and 90 minutes, then cooling said admixture to a temperature not lower than room temperature and maintaining said admixture at said lower temperature until constant surface hardness of the resin formed is obtained.

7. A method for the production of a resin which comprises contacting molten dicrotonylidene pentaerythritol with from about 0.4 to about 0.6 equivalent of water per equivalent of said dicrotonylidene pentaerythritol based upon moles of water per double bond, maintaining the thus formed mixture in the presence of an acidic catalyst at a temperature between the fusion temperature and about 80° C. for a period between about 45 and 90 minutes, then cooling said admixture to a temperature not lower than room temperature and maintaining said admixture at said lower temperature until constant surface hardness of the resin formed is obtained.

8. The product produced by the process of claim 1.
9. The product produced by the process of claim 4.
10. The product produced by the process of claim 5.

References Cited in the file of this patent

UNITED STATES PATENTS

| | | |
|---|---|---|
| 2,401,776 | Rothrock | June 11, 1946 |
| 2,569,932 | Izard | Oct. 2, 1951 |
| 2,687,407 | Orth | Aug. 24, 1954 |

FOREIGN PATENTS

| | | |
|---|---|---|
| 870,032 | Germany | Mar. 9, 1953 |

OTHER REFERENCES

Schulz et al.: Angewandte Chemie, vol. 62, Mar. 7, 1950, pp. 105, 113, 114, 117, 118.

Wagner: PB 73, 715, Frames 6381–6411, Office of Technical Service, U.S. Dept. of Commerce, Washington 25, D.C., Oct. 3, 1947.